3,363,449
DEVICE FOR MEASURING THE LEAK-TIGHTNESS OF FILTERING MASKS
Paul Ulmann, Bagnols-sur-Ceze, France, assignor to Commissariat à l'Energie Atomique, Paris, France
Filed Jan. 17, 1966, Ser. No. 521,181
Claims priority, application France, Jan. 21, 1965, 2,842
6 Claims. (Cl. 73—40)

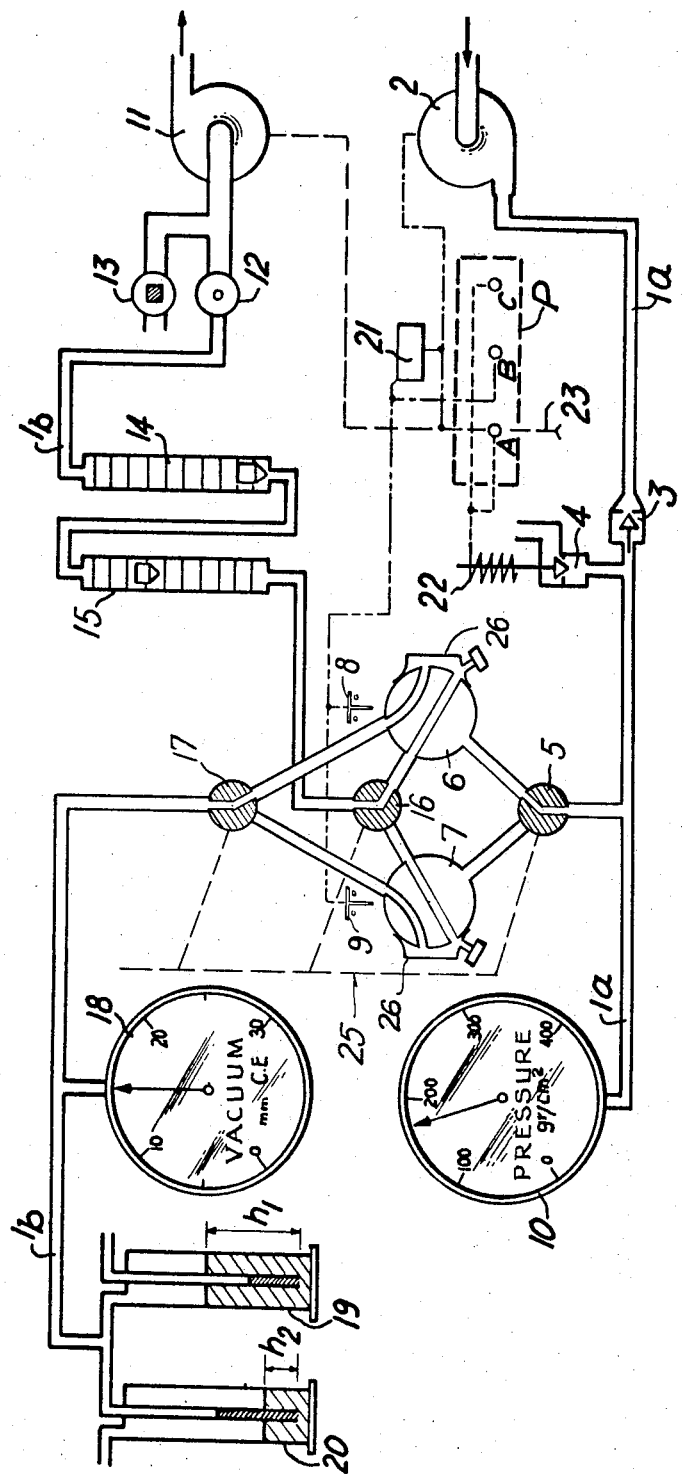

ABSTRACT OF THE DISCLOSURE

Apparatus for testing the tightness of face masks has a pressure system and a vacuum system. The mask is mounted on a flexible head which is inflated by the pressure system to form a seal around the edges of the mask. A vacuum is then drawn by the vacuum system between the head and the mask and any leakage through the mask is measured to determine its tightness.

---

The present invention relates to a device for measuring the leak-tightness afforded by the face-piece of a filtering mask for respiratory protection.

The degree of protection afforded by a filtering respiratory apparatus depends on the stopping power of the filter cartridge on the one hand and on the leak-tightness of the face-piece on the other hand. The filter cartridges which are at present employed have very high performances; and in the final analysis, it is the leak-tightness of the face piece which determines the quality of a filtering mask.

There are at present in existence many different types of apparatus for testing the leak-tightness of masks, but such devices are subject to various drawbacks:

(1) The testing fluids employed are dirty aerosols or gases which are more or less corrosive and which entail the use of color reagents;

(2) The testing operation is carried out by overpressurizing the mask whereas, under actual utilization conditions, it operates under reduced pressure.

(3) The value of overpressure which is employed is wholly unrelated to the actual pressure (or partial vacuum) of utilization of the mask;

(4) These apparatuses indicate a leakage with more or less sensitivity but do not measure such leakage.

The primary object of this invention is to make said apparatuses such that they meet practical requirements more effectively than has been the case up to the present time, especially insofar as they take a measurement of leakage flow rates by means of a testing fluid which is air and by producing a partial vacuum within the mask, the value of said partial vacuum being adjusted to the mean value of the partial vacuum which is in fact produced during inhalation.

The invention mainly consists of an apparatus which consists on the one hand of an inflating system comprising at least one inflatable head over which the face-piece to be tested is to be placed, said head being inflatable by a diaphragm pump or vane pump to a maximum volume which is limited by a micro-switch and deflatable by an electrovalve, and a strip manometer disposed in said inflating system at the end which is remote from said diaphragm pump and, on the other hand, of a system for producing a partial vacuum comprising a suction pump, a needle valve with by-pass which serves to regulate the degree of vacuum produced beneath said face-piece, rotameters for measuring the evacuation rate, a capsule manometer disposed in said partial vacuum system at the end remote from said suction pump and protected by fluid traps.

In addition to the main arrangement outlined above, the invention further consists in certain other arrangements which are preferably employed at the same time and which can be considered either separately or in any and all possible combinations:

The apparatus comprises two inflatable heads of identical design;

One change-over valve is placed at the inlet of said two inflatable heads in the inflating system, two change-over valves are placed at the inlet and at the outlet of said inflatable heads in the partial vacuum system, said three change-over valves being operable by means of a single control means;

Each inflatable head comprises a micro-switch for limiting the maximum volume thereof, said micro-switches being series-connected in an electric circuit comprising a pulse relay through which said micro-switches are connected both to the inflating pump and to a control panel;

A valve is placed in said inflating system between the inflating pump and the deflating electrovalve;

The partial vacuum produced within said face-piece is adjusted to 15 mm. $H_2O$, namely to the mean value of the actual reduced pressure which is produced within the mask during inhalation and under utilization conditions, with a complete filter cartridge and at a mean flow rate of 30 liters per minute.

A better understanding of the invention will in any case be obtained from the complementary description which follows below and from the accompanying drawing, it being understood that said complementary description and drawing are given solely by way of indication and not in any limiting sense.

The single figure of the accompanying drawing is a schematic presentation of an apparatus in accordance with the invention.

As can be seen from said figure, the apparatus comprises an inflating system 1a as shown at the bottom of the figure and a reduced pressure or partial vacuum system 1b as shown at the top of the figure.

The inflating system 1a is provided successively with a diaphragm pump or vane pump 2, a valve 3, an electrovalve 4, the control system of which will be described later, a change-over valve 5, two inflatable heads 6 and 7, the maximum volume of which is limited respectively by means of two micro-switches 8 and 9 connected in series, and finally a strip manometer 10 which is intended to measure the presence of inflation of the heads 6 and 7.

The partial vacuum system 1b comprises in succession a suction pump 11, a needle valve 12 provided with a by-pass 13 which makes it possible to adjust the degree of vacuum to the desired value, rotameters 14 and 15 which serve to measure the evacuation rate, change-over valves 16 and 17 which are placed respectively at the inlet and at the outlet of the inflatable heads 6 and 7, a capsule manometer 18 which serves to measure the degree of vacuum, and finally, fluid traps 19 and 20 which protest the manometer 18 against any positive or negative overpressures which may arise.

The example described provides for two inflatable heads 6 and 7. However, it would not constitute a departure from the scope of the invention to provide only one inflatable head or, on the contrary, more than two. In the case of two inflatable heads which is described and illustrated, the movement of rotation of the change-over valves 5, 16 and 17 will be effected by means of a single control unit generally indicated at 25.

A control panel P is provided with three control knobs A, B and C which are connected to the electric circuits of the different control units. The knob A is designed to control the starting or stopping of the whole apparatus and is connected both to the pumps 2 and 11, to the micro-switches 8 and 9 by way of a pulse relay 21, and to the electrovalve 4. The knob B serves to control the inflation of the heads 6 and 7 and is connected to the micro-switches 8 and 9 and to the pump 2 by way of the relay 21. Finally, the knob C controls the deflation and is connected to the winding 22 of the electrovalve 4. It should be added that the knob A is also connected to ground at 23.

The face-piece of the mask 26 which is to be tested and which is fitted with its filter cartridge, the inlet of which has been closed off, is placed on one of the inflatable heads 6 or 7. The change-over valves 5, 16 and 17 are then placed in a position such that the inflatable head chosen is put into relation with the circulation systems 1a and 1b. By means of the knob A, the apparatus is switched on and the suction pump 11 is started up; by means of the knob B, the head which is chosen is inflated into contact with the edge of mask 26 to simulate the face of a wearer. By operating the needle valve 12, the partial vacuum produced beneath the face-piece is adjusted to the desired value. The evacuation rate which is necessary in order to maintain said partial vacuum is read from the rotameters 14 and 15 and corresponds to the leakage flow rate of the mask 26.

In a particular example of measurement by means of the apparatus which has just been described, the value of the partial vacuum produced is adjusted to 15 mm. $H_2O$, which is the mean value of reduced pressure (partial vacuum) produced within the mask 26 under actual utilization conditions by a wearer during inhalation, using a complete cartridge and a mean evacuation rate of 30 liters per minute. Again in the case of this particular example, the capsule manometer 18 is graduated from 0 to 30 mm. $H_2O$ and the strip manometer 10 is graduated from 0 to 400 gr./cm.$^2$. For adequate tightness of the mask, a flow rate of 6 l./h. will be read at the top of the rotameter 15 and a flow rate of 60 l./h. will be read at the top of the rotameter 14; the respective depths $h_1$ and $h_2$ of the fluid traps 19 and 20 will in that case be 30 mm. and 10 mm.

As will be readily understood, and as will in any case be apparent from the foregoing description, the present invention is not limited in any sense to the example of construction or to the modes of application which have been more specifically described and contemplated herein, but extends to all alternative forms.

What we claim is:
1. Device for measuring the leak-tightness afforded by the face-piece of a filtering mask for respiratory protection, comprising an inflating system, at least one inflatable head in said system over which the face-piece to be tested is to be placed, a pump in said system for inflating said head to a maximum volume, a micro-switch in said system limiting said maximum volume and an electro-valve in said system for deflating said head, and a strip manometer disposed in said inflating system remote from said pump and, a system for producing a partial vacuum between said head and the face-piece comprising a suction pump, a needle valve with a by-pass in said partial vacuum system to regulate the degree of vacuum produced beneath the face-piece, rotameters in said partial vacuum system for measuring the evacuation rate, a capsule manometer disposed in said partial vacuum system remote from said suction pump and fluid traps in said partial vacuum system protecting said manometer.

2. Device in accordance with claim 1, said device having two identical inflatable heads.

3. Device in accordance with claim 2, a change-over valve being connected at the inlet of said two inflatable heads in said inflating system, two change-over valves being connected at the inlet and at the outlet of said inflatable heads in said partial vacuum system, and a single control means for said three change-over valves.

4. Device in accordance with claim 2, said micro-switches being series-connected in an electric circuit including a pulse relay through which said micro-switches are connected to said inflating pump and to a control panel.

5. Device in accordance with claim 1, including a valve in said inflating system between said pump and said electrovalve.

6. Device in accordance with claim 1, the partial vacuum produced within said face-piece being adjusted to 15 mm. $H_2O$, the mean value of the actual reduced pressure which is produced within the mask during inhalation and in use, with a complete filter cartridge and at a mean flow rate of 30 liters per minute.

References Cited

UNITED STATES PATENTS

| 2,449,053 | 9/1948 | Burns et al. | 73—40 |
| 2,738,669 | 3/1956 | Silverman et al. | 73—40 |

FOREIGN PATENTS

| 724,174 | 4/1932 | France. |
| 539,204 | 11/1931 | Germany. |
| 698,045 | 10/1940 | Germany. |
| 2,183 | 9/1860 | Great Britain. |

LOUIS R. PRINCE, *Primary Examiner.*

JEFFREY NOLTON, *Assistant Examiner.*